July 12, 1949.  A. D. FORBES  2,476,139
DISTRIBUTION TRANSFORMER FOR BANKING SERVICES
Filed Feb. 20, 1946  2 Sheets-Sheet 1
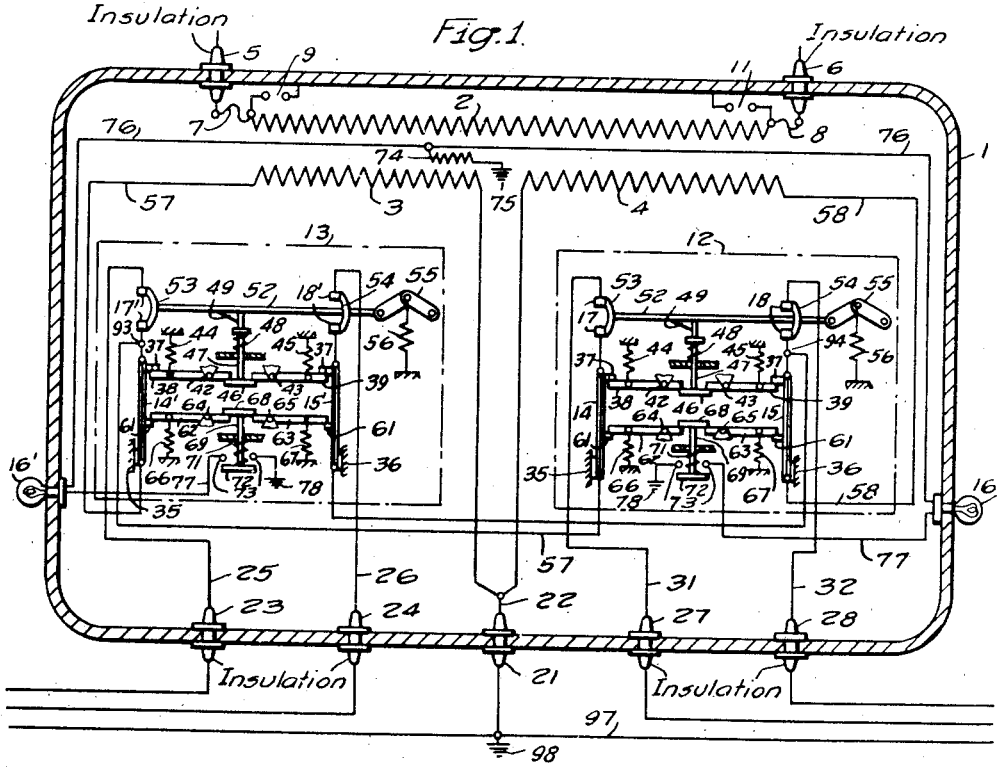
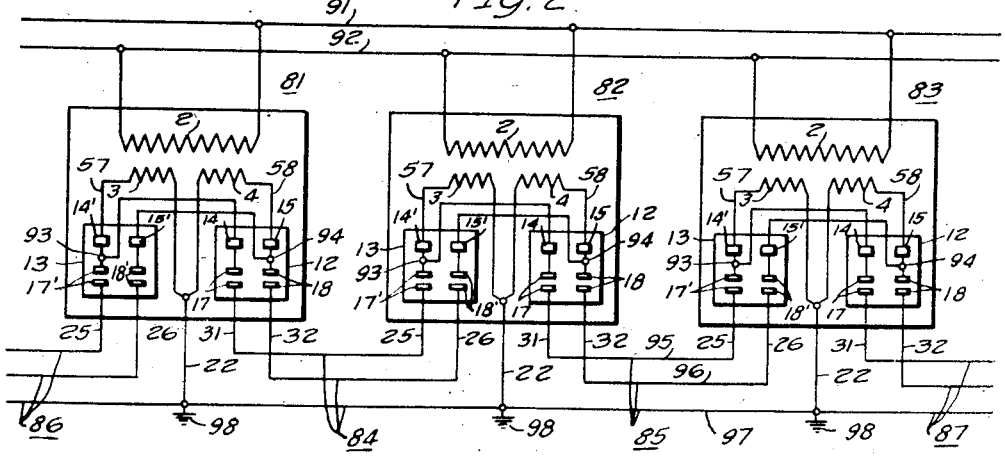
WITNESSES:
INVENTOR
Allan D. Forbes.
BY
Franklin E. Hardy
ATTORNEY

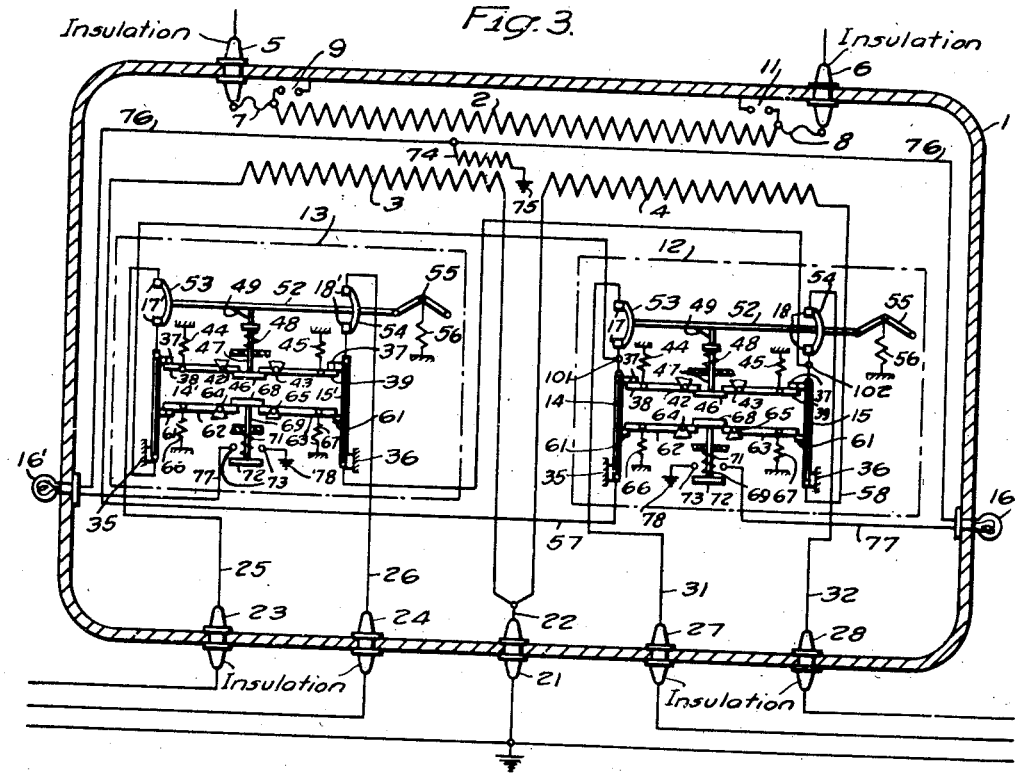
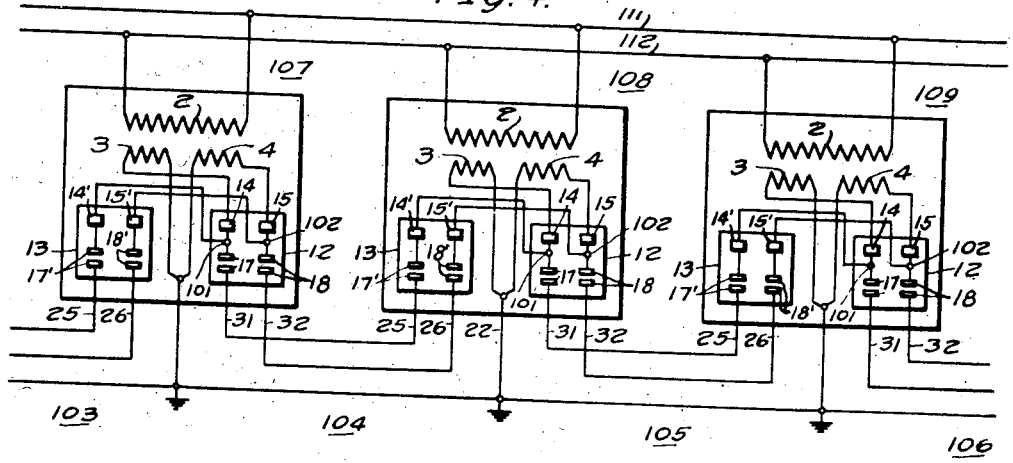

Patented July 12, 1949

2,476,139

UNITED STATES PATENT OFFICE 2,476,139

DISTRIBUTION TRANSFORMER FOR BANKING SERVICE

Allan D. Forbes, Sharon, Pa., assignor to Westinghouse Electric Corporation, East Pittsburgh, Pa., a corporation of Pennsylvania Application February 20, 1946, Serial No. 649,074

17 Claims. (Cl. 175—294)

My invention relates to distribution transformers and, more particularly, to such transformers arranged for banking service.

Some time ago, the secondary network system of electrical distribution was developed in order to improve the reliability of service and provide good voltage regulation in heavy density load areas. In such a system, a network of interconnected secondary circuits is supplied with electric energy from a plurality of feeder circuits, each connected to the secondary network circuits through a plurality of transformers provided with network protectors. The network protector is controlled to disconnect the transformer secondary winding from the network circuit upon the reversal of power flow through the transformer which may be caused by a fault on the associated feeder, thus disconnecting the faulty feeder circuit from the network circuit. The network circuit then continues to receive energy from the remaining feeder circuits through the transformers connected to those circuits without interrupting the service supplied from the network circuit.

In many places, network distribution systems can not be justified due to the expense involved, a better class of service is required than can be obtained from ordinary radial systems. This can be done by banking or interconnecting of the secondaries of transformers together to supply energy to the low voltage distribution circuit through a plurality of distribution transformers connected in parallel.

In United States Patent No. 2,340,057, to John K. Hodnette, for Distribution transformer for banking service, issued January 25, 1944, and assigned to the same assignee as the present application, a transformer for banking service is disclosed and claimed, that is provided for connection between a high voltage feeder circuit and two or more low voltage distribution circuit portions, the transformer secondary being connected to one of the circuit portions through one circuit breaker only, and to another of the circuit portions through two circuit breakers, the breakers being adjusted to operate in a predetermined sequence so that the first trip segregates one circuit portion from the transformer without interrupting the supply of energy to the other circuit portion. The other breaker operates to disconnect the transformer secondary from both distribution circuit portions. Under certain circuit conditions, a fault may occur that will cause the second-named breaker to so operate as to disconnect the entire load from the transformer, regardless of the particular load being supplied to the branch circuit the controlling breaker of which should normally operate first.

In the copending application of John K. Hodnette, for Distribution transformer for banking service, Serial No. 649,073, filed February 20, 1946, and assigned to the same assignee as this application, a transformer for banking service is illustrated and claimed for connection between a high voltage feeder circuit and two or more low voltage distribution circuit portions, the transformer secondary winding being connected to the plurality of circuit portions through separate circuit breakers so that the supply of load current to each distribution circuit portion may continue upon interruption of the supply of current to another distribution circuit portion. In accordance with the invention disclosed and claimed in the copending Hodnette application, the means for disconnecting any distribution circuit portion from the transformer secondary winding operates independently of the means for disconnecting any other distribution circuit portion from the transformer secondary winding.

It is an object of this invention to provide a transformer for banking service for connection between a high voltage feeder circuit and two or more low voltage distribution circuit portions, the transformer secondary winding being connected to the plurality of circuit portions through separate circuit breakers so that the supply of load current to each distribution circuit portion served by the transformer may continue upon interruption of the supply of current flow to another distribution circuit portion from the transformer.

It is a further object of the invention to provide a transformer of the above-indicated character in which the control means for initiating the opening of the said separate circuit breakers, or at least one of them, are responsive both to the current in the distribution circuit portion controlled by the particular circuit breaker and also to the total output current of the transformer secondary winding.

It is a still further object of the invention to provide a transformer of the above-indicated character in which the means for initiating the opening of the separate circuit breakers are responsive to the temperature of the oil in which the transformer is immersed and to the current flowing in the particular circuit conductors to which the means for initiating the operation of the circuit breaker is responsive.

Other objects and advantages of the invention will be apparent from the following description of preferred embodiments thereof, reference being had to the accompanying drawings, in which:

Figure 1 is a diagrammatic view of circuits and apparatus comprising a transformer organized in accordance with one embodiment of the invention;

Fig. 2 is a diagrammatic view of circuit illustrating the application of a group, or bank, of such transformers in a distribution circuit system;

Fig. 3 is a diagrammatic view of circuits and apparatus comprising a transformer organized in accordance with another embodiment of the invention; and Fig. 4 is a diagrammatic view of circuits illustrating the application of a bank of transformers corresponding to that shown in Fig. 3 in a distribution circuit system.

Referring to the drawings and particularly to Figures 1 and 2 thereof, the transformer disclosed consists of a tank 1 enclosing a primary winding 2 and a secondary winding shown as having two portions 3 and 4. The primary winding is connected through bushings 5 and 6 to a source of electrical energy through circuit conductors including protective links 7 and 8 which are provided to disconnect the transformer from the high voltage circuit in case of a fault in the transformer itself. Arc-discharge devices 9 and 11 are provided between the terminals of the winding 2 and the tank and are here illustrated diagrammatically as simple gaps, but it will be understood that they may comprise any other conventional discharge gap devices, such as those described in United States Patent No. 2,066,935, issued January 5, 1937, to John K. Hodnette, and assigned to the same assignee as this application. Mounted within the casing 1 are two circuit breakers indicated by the rectangles 12 and 13 shown in dot and dash lines.

The circuit breaker 12 is connected to provide thermal protection to the transformer windings by interrupting the circuit connections between the transformer secondary winding and one of the portions of the distribution circuit. The circuit breaker 13 is connected to provide thermal protection to the transformer windings by interrupting the circuit connections between the transformer secondary winding and another portion of the distribution circuit. The two circuit breakers are essentially alike, each being subject to the control of thermal elements 14 and 15, and 14' and 15', respectively connected in the two conductors leading from the secondary winding of the transformer. The thermal elements 14 and 14' are in series in the circuit conductor leading from the left end of the transformer secondary winding to the portion of the distribution circuit to the right of the transformer, and the thermal elements 15 and 15' are in series in the circuit conductor leading from the right end of the secondary winding to the portion of the distribution circuit to the left of the transformers. On the other hand, the conductor from the left end of the transformer secondary winding, extending through the circuit breaker 13 to the distribution circuit portion to the left of the transformer, includes one thermal element 14' only, and the conductor from the right end of the transformer secondary winding extending through the circuit breaker 12 to the distribution circuit portion to the right of the transformer includes one thermal element 15 only. In each pair of conductors, extending from the transformer secondary winding and comprising the conductors controlled by a particular circuit breaker, one such conductor includes a thermal element associated with each circuit breaker and the other conductor includes a single thermal element only, associated with the circuit breaker controlling the flow of current from the particular transformer to the particular secondary distribution circuit in question.

Each of the thermal elements associated with each circuit breaker is connected for tripping two latches, one of which controls a temperature indicating signal device, shown as lamps 16 and 16', to indicate overload on the transformer, and the other of which subsequently operates the associated breaker contact members 17 and 18 or 17' and 18' of the two breakers 12 and 13, respectively. It will be noted that five secondary bushings are employed, the bushing 21 accommodating the neutral line conductor 22 connected to the joined ends of the two secondary windings 3 and 4 and which is connected to the neutral of the distribution system which is usually grounded. The bushings 23 and 24 accommodate conductors 25 and 26, respectively, comprising the section circuit conductors extending in one direction from the transformer; and the bushings 27 and 28 accommodate the conductors 31 and 32 comprising the section circuit conductors extending in the other direction from the transformer, these two sets of circuit conductors representing separate distribution circuit portions of the distribution system.

Referring to Figure 1, the remaining parts of the circuit breakers will be described in further detail, the description being directed particularly to the breaker 12, the breaker 13 being shown for the purpose of illustration as identical in construction to the circuit breaker 12 and the corresponding parts being indicated by the same numerals as in the circuit breaker 12 except that the numerals are primed. It is not essential in practice that, in certain cases, the circuit breakers be identical in construction, or that the actuating means be the same for both breakers. The bimetal elements 14 and 15 which are positioned in the transformer casing below the level of the cooling and insulating liquid constitutes thermally actuated load responsive elements for initiating the operation of the circuit breaker 12 to disconnect the transformer secondary winding from the circuit conductors 31 and 32. The bimetal elements 14 and 15 are mounted on suitable abutments 35 and 36 respectively, and are provided with latches 37 carried by their outer or moving ends that are adapted to disengage tripping members 38 and 39 pivotally mounted on pins 42 and 43, respectively, and biased by the springs 44 and 45. The ends of the tripping members 38 and 39 remote from the latches 37 are positioned adjacent to an operating member 46 attached to a latch rod 47 that is normally biased by the spring 48 to its illustrated position to engage a projection 49 carried by a switch operating member 52 for maintaining the switch operating contact members 53 and 54 in circuit closing positions. Upon disengagement of the rod 47 from the projection 49, the circuit interrupting contact members 53 and 54 are actuated by the rod 52 and toggle mechanism 55 by the spring 56. This may be brought about by heating either of the bimetal elements 14 or 15 sufficiently to release its associated latch 37 from engagement with the associated tripping members 38 or 39 so that, should the output circuit from either of the conductors 57 or 58 increase above the desired value for which the equipment is set to operate, the circuit breaker 12 will be tripped, and will open the circuit between the transformer secondary winding and the circuit conductors 31 and 32.

For the purpose of controlling the energization of the signal light 16, additional tripping means is provided which may also be operated by the latches 37, but which, for the purposes of clearer illustration, are here indicated as being tripped by separate latches 61 which are so arranged as to be adapted to disengage tripping members 62 and 63 that are pivotally mounted on pivot pins 64 and 65, respectively, and biased by springs 66 and 67. The ends of the tripping members 62 and 63 that are remote from the latches 61 are positioned adjacent to an operating member 68 attached to a switch operating rod 69 normally biased by a spring 71 to its illustrated position to hold the switch contact member 72 in a circuit interrupting position. Upon disengagement of the latch 61, associated with either the bimetal 14 or the bimetal 15, the operating member 68 will be moved to cause the switch contact member 72 to close a circuit through the contact members 73, thus energizing the lamp 16 through a circuit receiving energy from a winding 74 shown as inductively related to the primary winding 2 and having one terminal grounded at 75. This circuit extends through conductor 76 to the lamp 16, conductor 77, the switch contact members 73 and 72, to the ground at 78.

The circuit breaker devices 12 and 13 and the control mechanism therefor that is actuated in response to the bimetal elements 14 and 15 may correspond to the circuit breaker construction disclosed and claimed in United States Patent No. 2,169,586, issued to M. G. Leonard, August 15, 1939, and assigned to the same assignee as this application. Such a circuit breaker is mounted to operate under the oil in which the transformer is immersed so that the bimetal elements 14 and 15 are responsive to the oil temperature, and is also responsive to the current flowing in the secondary circuits from the transformer to which the particular bimetal elements of the circuit breakers are responsive.

The circuit breaker devices may be so adjusted that the signal device 16 will be energized by closing the circuit through contact members 72 and 73 prior to the heating of the bimetal elements 14 or 15 sufficiently to trip the breaker and interrupt the circuit through the contact members 17 and 18. The signal light is thereby used both to indicate the overload on the transformer and also the operation of the breaker to disconnect the unit from the system. The bimetal 15' of the circuit breaker 13 and the bimetal 14 of the circuit breaker 12 are calibrated to trip their associated breakers slightly ahead of bimetals 14' and 15, respectively, assuming that the same current is flowing in each bimetal. The circuit breakers are so designed and adjusted that either of the two bimetals 14 and 15, or 14' and 15', associated respectively with the circuit breakers 12 and 13, will trip both circuit interrupting contacts of the breaker, when the trip temperatures of the bimetals are reached.

It will be noted, by reference to Fig. 2 in which transformers 81, 82 and 83 are illustrated, representing a bank of transformers similar to Fig. 1 of which any number may be used, that the circuit conductors for the various distribution circuit portions, such as 84 and 85, are supplied with energy from two separate transformers, the current to such circuit portions flowing from one transformer through the breaker 12 and from the adjacent transformer in the bank through the circuit breaker 13. The sections 86 and 87 may be dead-end sections supplied from one transformer only. Whenever possible, it is preferable to connect the two ends of the distribution circuit together to form a closed loop in which case the several transformers will all be similarly connected to the two adjacent circuit portions, there being no dead-end sections.

It will be noted, by reference to Fig. 2, that the plurality of transformers 81, 82 and 83 are connected between a feeder circuit comprising conductors 91 and 92 and a secondary circuit comprising the several distribution sections or portions 84, 85, 86 and 87, which are illustrative of a banking system employing any number of transformers. All of the bimetal elements 14, 15, 14' and 15' are responsive to the entire load on the transformer with which it is associated as indicated by oil temperature and also to the current flowing through the particular bimetal which, in the case of the bimetals 14' and 15 respectively, includes all secondary current flowing from the left end and right end, respectively, of the transformer secondary winding; while, in the case of the bimetals 15' and 14, includes current flowing only through the section circuit breaker 13 or the section circuit breaker 12, respectively, as is clearly apparent from the drawing.

Under normal conditions, the transformer 82 will carry part of the load supplied to section 84 and part of the load supplied to section 85. However, in case there is a fault between conductor 95 and ground in section 85, or between the conductor 95 and the neutral conductor 97 which is grounded at 98, the fault current will be drawn through the bimetals 14 and 14' in transformer 82, and fault current will also be drawn through the bimetal 14 and contact 17 from the transformer 81. The bimetal 14 of transformer 82 therefore carries more current than the bimetal 14' and it will therefore cause the breaker 12 of the transformer 82 to trip, thereby isolating the fault on one side. Also, since the bimetal 14 carries current flowing to one only of the distribution circuit sections supplied by the transformer, it will normally be calibrated to trip at a lower current value than the bimetal 14' which carries the entire current output from the left end of the secondary winding 3. The transformer 82 continues to feed useful load to section 84.

The action in transformer 82 would be somewhat different in case transformer 81 were omitted, and the section 82 were a dead-end. In this case, the fault current carried by the bimetal 14 would be the same as the fault current carried by the bimetal 14'. Therefore, in order to insure that the breaker 12 will trip before the breaker 13, it is essential that the bimetal 14 be calibrated to trip at a slightly lower temperature than the bimetal 14'.

The action in the transformer 83 is also affected by the fault between circuit conductor 95 and ground. In this transformer, fault current is drawn through bimetal 14' only, and breaker 13 is tripped. In case there was another transformer beyond section 87, so that this section is not a dead-end section, current would be drawn through bimetal 14, but this fault current would be much less than that drawn through bimetal 14' due to the impedance of section 87, and breaker 13 of the transformer 83 would therefore trip first.

A similar action would take place in case of a fault between circuit conductor 96 and the neutral or grounded conductor 97 of section 85, or in case of a fault between conductors 95 and 96. Under all these conditions, the fault is isolated by breakers on either side of the fault with all transformers remaining in service to feed the unfaulted sections of the secondary distribution circuit.

Referring to Figs. 3 and 4, another embodiment of the invention is illustrated, the transformer structure shown in Fig. 3 corresponding to that shown in Fig. 1, except for the particular circuit connections within the transformer casing. In the embodiment of the invention shown in Figs. 1 and 2, current flows from the two opposite ends of the secondary winding to junction points 93 and 94, the current from the left end of the secondary winding passing through the bimetal 14' prior to reaching the junction point 93 and the current flowing from the right end of the secondary winding flowing through the bimetal 15 prior to reaching the junction point 94. From the junction point 93, one circuit path extends through the contact member 17' of the circuit breaker 13 and to the left of the transformer, while the other branch passes through the bimetal 14 of the circuit breaker 12 and to the right from the transformer, so that one of these two paths includes the two thermal elements 14' and 14; while the other includes the thermal element 14' only. In a similar manner, all of the current flowing from the right end of the secondary winding of the transformer to the junction point 94 includes the bimetal 15. A portion of this current flows through the circuit breaker contacts 18 to the right of the transformer without including any other bimetal element. The remaining branch passes through the bimetal element 15' of the circuit breaker 13 and extends to the left of the transformer. Therefore, in both sections of the secondary circuit leading from the transformer, one conductor traces a circuit path including two bimetals in series, one in each of the two circuit breakers; while the other conductor traces a circuit path including a single bimetal element that controls the particular circuit only.

In the embodiment of the invention illustrated in Figs. 3 and 4, the opposite ends of the secondary winding are both connected to thermal elements in the same circuit breaker. As illustrated, the left end of the secondary winding passes through the bimetal 14 to the junction point 101 and the right end of the secondary winding is connected through the bimetal 15 to the junction point 102, the two junction points both being within the circuit breaker 12. Current flowing from these junction points to the distribution circuit portion extending to the right of the transformer include these two bimetal elements 14 and 15 only; while the current flowing from the junction points 101 and 102, through the circuit breaker 13 to the distribution circuit portion extending to the left of the transformer, includes the bimetals of the circuit breaker 13. That is to say, the bimetals 14 and 14', and the bimetals 15 and 15', are in series circuit relation in the distribution circuit portions extending to the left of the transformer; while the bimetal elements 14 and 15 only are included in the two conductors controlled by the circuit breaker 12 extending to the right of the transformer.

As shown in Fig. 4, distribution circuit portions 103, 104, 105 and 106 are supplied through a bank of transformers 107, 108 and 109, connected to primary circuit conductors 111, 112. In the case of a fault in section 105, fault current will be drawn through one or both of the bimetals 14 and 15 of transformer 108, with a small fault current being drawn from the transformer 107 through bimetals 14' and 15' of the transformer 108. Although, for reasons to be described later, the bimetals 14' and 15' are calibrated to trip at a lower current than the bimetals 14 and 15, yet the larger amount of the fault current that is drawn through the bimetals 14 and 15 will cause the breaker 12 to trip and isolate the fault in section 105 from the transformer 108. The fault in this section will also draw a fault current through one or both of the bimetals 14' and 15' of the transformer 109. In order that the breaker 13 of the transformer 109 will trip before the breaker 12, the bimetals 14' and 15' are adjusted to trip the breaker 13 of transformer 109 at a lower trip current than the bimetals 14 and 15 of this transformer will cause the circuit breaker 12 thereof to trip. Therefore, the fault in section 105 is isolated by the opening of the breakers 12 in transformer 108 and 13 in the transformer 109, which transformers continue to serve the loads in sections 104 and 106, respectively.

With the arrangement of the circuits as shown in Figs. 3 and 4, the same action of the circuit breakers takes place, whether the faults are line-to-neutral faults or line-to-line faults. There is some advantage in this operation, in certain instances, over the operation of the structure shown in Figs. 1 and 2, since the same events take place, regardless of the nature of the fault.

It will be apparent to those skilled in the art that modifications in the circuits and arrangements of parts may be made within the spirit of my invention, and I do not wish to be limited otherwise than by the scope of the appended claims.

I claim as my invention:

1. In combination, an electrical transformer comprising a casing, a primary winding and a secondary winding within the casing, a pair of circuit conductors from said secondary winding to a pair of junction points, a plurality of cooperating pairs of circuit conductors extending from said junction points through the casing to separate distribution circuit portions exterior to the casing, a plurality of separate section circuit breakers within the casing associated, respectively, with said plurality of distribution circuit portions, each of said circuit breakers being arranged for disconnecting one pair of secondary conductors comprising one of said separate distribution circuit portions from said junction points, each of said circuit breakers having two current responsive elements for initiating the opening of the circuit breaker, the circuit from the secondary winding through one of said conductors from each junction point including in series one of the said current responsive elements associated with each of said circuit breakers, and the circuit from the secondary winding through another of said conductors from each of said junction points including a single current responsive element only associated with the circuit breaker for interrupting the distribution circuit portion supplied through said conductor.

2. In combination, an electrical transformer comprising a casing, a primary and a secondary winding within the casing, a first distribution circuit portion including two conductors leading from said secondary winding, and a second distribution circuit portion including two conductors leading from said secondary winding, a section circuit breaker within said casing for disconnecting said first section circuit from said secondary winding, a second section circuit breaker within said casing for disconnecting said second section circuit from said secondary winding, means responsive to a condition of the transformer comprising a pair of thermal means associated with each circuit breaker for operating the associated section circuit breaker upon a predetermined intensity of said condition of the transformer, one thermal means of the pair associated with each of the section circuit breakers being responsive to current flowing from the transformer secondary winding to both of said section circuits, and the other one of said pair of thermal means associated with each circuit breaker being responsive to current flowing only in the section circuit controlled by the said section circuit breaker.

3. In combination, an electrical transformer comprising a casing, a primary and a secondary winding within the casing, a first distribution circuit portion including two conductors leading from said secondary winding, and a second distribution circuit portion including two conductors leading from said secondary winding, a section circuit breaker within said casing for disconnecting said first section circuit from said secondary winding, a second section circuit breaker within said casing for disconnecting said second section circuit from said secondary winding, means responsive to a condition of the transformer comprising a pair of thermal means associated with each circuit breaker for operating the associated section circuit breaker upon a predetermined intensity of said condition of the transformer, each of the pair of thermal means associated with one section circuit breaker being responsive to current flowing from the transformer secondary winding to both of said section circuits, and each of the pair of thermal means associated with the other section circuit breaker being responsive to current flowing only in the section circuit that is controlled by said section circuit breaker.

4. In combination, an electrical transformer comprising a casing, a primary and a secondary winding within the casing, a first distribution circuit portion including two conductors leading from said secondary winding, and a second distribution circuit portion including two conductors leading from said secondary winding, a section circuit breaker within said casing for disconnecting said first section circuit from said secondary winding, a second section circuit breaker within said casing for disconnecting said second section circuit from said secondary winding, means responsive to a condition of the transformer comprising a pair of thermal means associated with each circuit breaker for operating the associated section circuit breaker upon a predetermined intensity of said condition of the transformer, one thermal means associated with each circuit breaker being connected to one end of the transformer secondary winding, the other thermal means associated with each circuit breaker being connected to the other end of the transformer secondary winding, two of the thermally responsive means, connected to opposite ends of the transformer secondary winding, being responsive to the current flowing between that end of the secondary winding and both section circuits, the remaining two of the said thermally responsive means, connected to the opposite ends of the transformer secondary winding, being responsive to current flowing only in the section circuit that is controlled by said section circuit breaker.

5. In combination, an electrical transformer comprising a casing, a liquid dielectric therein, a primary winding and a secondary winding within the casing, a pair of circuit conductors from said secondary winding to a pair of junction points, two cooperating pairs of circuit conductors extending from said junction points through the casing to two separate distribution circuit portions exterior to the casing, two separate section multipole circuit breakers within the casing associated, respectively, with said two distribution circuit portions, each of said multipole circuit breakers being arranged for disconnecting one pair of secondary conductors comprising one of said separate distribution circuit portions from said junction points, means responsive to a condition of the transformer comprising a plurality of thermal responsive elements immersed in said liquid dielectric and responsive, both to the temperature of said dielectric and to the current flowing in one of the secondary circuit conductors, each of said multipole circuit breakers having two of said thermal responsive elements associated therewith for initiating the opening of the circuit breaker, the circuit from the secondary winding through one of said conductors from each junction point including in series one of the said thermal responsive elements associated with each of said circuit breakers, and the circuit from the secondary winding through another of said conductors from each of said junction points including a single thermal responsive element only associated with the circuit breaker for interrupting the distribution circuit portion supplied through said conductor.

6. In combination, an electrical transformer comprising a casing, a liquid dielectric therein, a primary and a secondary winding within the casing, a first distribution circuit portion including two conductors leading from said secondary winding, and a second distribution circuit portion including two conductors leading from said secondary winding, a multipole section circuit breaker within said casing for disconnecting said first section circuit from said secondary winding, a second multipole section circuit breaker within said casing for disconnecting said second section circuit from said secondary winding, means responsive to a condition of the transformer comprising a pair of thermal means associated with each circuit breaker for operating the associated section circuit breaker upon a predetermined intensity of said condition of the transformer, one thermal means of the pair associated with each of the section circuit breakers being responsive both to the temperature of said dielectric and to current flowing from the transformer secondary winding to both of said section circuits, and the other one of said pair of thermal means associated with each circuit breaker being responsive both to the temperature of said dielectric and to current flowing only in the section circuit controlled by the said section circuit breaker, the several thermal means being individually operable for operating their associated section circuit breakers upon individual predetermined intensities of said condition of the transformer.

7. In combination, an electrical transformer comprising a casing, a liquid dielectric therein, a primary and a secondary winding within the casing, a first distribution circuit portion including two conductors leading from said secondary winding, and a second distribution circuit portion including two conductors leading from said secondary winding, a multipole section circuit breaker within said casing for disconnecting said first section circuit from said secondary winding, a second multipole section circuit breaker within said casing for disconnecting said second section circuit from said secondary winding, means responsive to a condition of the transformer comprising a pair of thermal means associated with each circuit breaker for operating the associated section circuit breaker upon a predetermined intensity of said condition of the transformer, each of the pair of thermal means associated with one section circuit breaker being responsive both to the temperature of said dielectric and to current flowing from the transformer secondary winding to both of said section circuits, and each of the pair of thermal means associated with the other section circuit breaker being responsive both to the temperature of said dielectric and to current flowing only in the section circuit that is controlled by said section circuit breaker, the several thermal means being individually operable for operating their associated section circuit breakers upon individual predetermined intensities of said condition of the transformer.

8. In combination, an electrical transformer comprising a casing, a liquid dielectric therein, a primary and a secondary winding within the casing, a first distribution circuit portion including two conductors leading from said secondary winding, and a second distribution circuit portion including two conductors leading from said secondary winding, a multipole section circuit breaker within said casing for disconnecting said first section circuit from said secondary winding, a second multipole section circuit breaker within said casing for disconnecting said second section circuit from said secondary winding, means responsive to a condition of the transformer comprising a pair of thermal means associated with each circuit breaker for operating the associated section circuit breaker upon a predetermined intensity of said condition of the transformer, one thermal means associated with each circuit breaker being connected to one end of the transformer secondary winding, the other thermal means associated with each circuit breaker being connected to the other end of the transformer secondary winding, two of the thermally responsive means, connected to opposite ends of the transformer secondary winding, being responsive to the current flowing between that end of the secondary winding and both section circuits and to the temperature of said dielectric, the remaining two of the said thermally responsive means, connected to the opposite ends of the transformer secondary winding, being responsive to current flowing only in the section circuit that is controlled by said section circuit breaker and to the temperature of said dielectric, the several thermal means being individually operable for operating their associated section circuit breakers upon individual predetermined intensities of said condition of the transformer.

9. In combination, an electrical transformer comprising a casing, a primary winding and a secondary winding within the casing, a pair of circuit conductors from said secondary winding to a pair of junction points, two cooperating pairs of circuit conductors extending from said junction points through the casing to two separate distribution circuit portions exterior to the casing, two separate multipole section circuit breakers within the casing associated, respectively, with said two distribution circuit portions, each of said multipole circuit breakers being arranged for disconnecting one pair of secondary conductors comprising one of said separate distribution circuit portions from said junction points, each of said circuit breakers having two current responsive elements for initiating the opening of the circuit breaker, the circuit from the secondary winding through one of said conductors from each junction point including in series one of the said current responsive elements associated with each of said circuit breakers, and the circuit from the secondary winding through another of said conductors from each of said junction points including a single current responsive element only associated with the circuit breaker for interrupting the distribution circuit portion supplied through said conductor, the several current responsive elements being individually adjustable for operating their associated multipole section circuit breakers upon different predetermined intensities of current values.

10. In a transformer protective device, a circuit breaker comprising contact means, operating means for causing the opening of said contact means, current responsive means operable to cause said operating means to open the contact means, a pair of terminal means and means connecting said contact means and said current responsive means in series between said terminal means, a second circuit breaker also comprising contact means, operating means for causing the opening of said contact means, current responsive means operable to cause said operating means to open the contact means, a second pair of terminal means and means connecting said contact means and said current responsive means in series between said second pair of terminal means, and means connecting one of said terminal means of said second circuit breaker to the first circuit breaker at a point intermediate the contact means and current responsive means thereof.

11. In a transformer protective device, a multipole circuit breaker comprising contact means, operating means for causing the opening of said contact means, separate circuit responsive means associated with each pole of the circuit breaker operable to cause said operating means to open the contact means, a pair of terminal means and means connecting said contact means and said current responsive means in series between said terminal means, a second multi-pole circuit breaker also comprising contact means, operating means for causing the opening of said contact means, separate current responsive means associated with each pole of the circuit breaker operable to cause said operating means to open the contact means, a second pair of terminal means and means connecting said contact means and said current responsive means in series between said second pair of terminal means, the current responsive means associated with a pole of one of the circuit breakers being responsive to the sum of the currents through both circuit breakers, and the current responsive means associated with another pole of one of the circuit breakers being responsive to the current through one circuit breaker only.

12. In a transformer protective device, a multipole circuit breaker comprising contact means, operating means for causing the opening of said contact means, separate circuit responsive means associated with each pole of the circuit breaker operable to cause said operating means to open the contact means, a pair of terminal means and means connecting said contact means and said current responsive means in series between said terminal means, a second multi-pole circuit breaker also comprising contact means, operating means for causing the opening of said contact means, separate current responsive means associated with each pole of the circuit breaker operable to cause said operating means to open the contact means, a second pair of terminal means and means connecting said contact means and said current responsive means in series between said second pair of terminal means, the current responsive means associated with a pole of one of the circuit breakers being responsive to the sum of the currents through both circuit breakers, and the current responsive means associated with a pole of the other of said circuit breakers being responsive to the sum of the currents through both circuit breakers, and the current responsive means associated with the other poles of the two circuit breakers being responsive to the current through the associated circuit breaker only.

13. In a transformer protective device, a multi-pole circuit breaker comprising contact means, operating means for causing the opening of said contact means, separate circuit responsive means associated with each pole of the circuit breaker operable to cause said operating means to open the contact means, a pair of terminal means and means connecting said contact means and said current responsive means in series between said terminal means, a second multi-pole circuit breaker also comprising contact means, operating means for causing the opening of said contact means, separate current responsive means associated with each pole of the circuit breaker operable to cause said operating means to open the contact means, a second pair of terminal means and means connecting said contact means and said current responsive means in series between said second pair of terminal means, the current responsive means associated with each pole of one of the circuit breakers being responsive to the sum of the currents through both circuit breakers, and the current responsive means associated with each pole of the other of the circuit breakers being responsive to the current through one circuit breaker only.

14. In combination, an electrical transformer comprising a casing, a primary winding and a secondary winding within the casing, a plurality of circuit conductors from said secondary winding to a plurality of junction points, a plurality of circuit conductors extending from said junction points through the casing to separate distribution circuit portions exterior to the casing, a circuit breaker within the casing comprising contact means, operating means for causing the opening of said contact means, current responsive means operable to cause said operating means to open the contact means, a pair of terminal means and means connecting said contact means and said current responsive means in series between said terminal means, a second circuit breaker within the casing also comprising contact means, operating means for causing the opening of said contact means, current responsive means operable to cause said operating means to open the contact means, a second pair of terminal means and means connecting said contact means and said current responsive means in series between said second pair of terminal means, and means connecting one of said terminal means of said second circuit breaker to the first circuit breaker at a point intermediate the contact means and current responsive means thereof.

15. In combination, an electrical transformer comprising a casing, a primary winding and a secondary winding within the casing, a plurality of circuit conductors from said secondary winding to a plurality of junction points, a plurality of circuit conductors extending from said junction points through the casing to separate distribution circuit portions exterior to the casing, a multi-pole circuit breaker within the casing comprising contact means, operating means for causing the opening of said contact means, separate circuit responsive means associated with each pole of the circuit breaker operable to cause said operating means to open the contact means, a pair of terminal means and means connecting said contact means and asid current responsive means in series between said terminal means, a second multi-pole circuit breaker also comprising contact means, operating means for causing the opening of said contact means, separate current responsive means associated with each pole of the circuit breaker operable to cause said operating means to open the contact means, a second pair of terminal means and means connecting said contact means and said current responsive means in series between said second pair of terminal means, the current responsive means associated with a pole of one of the circuit breakers being responsive to the sum of the currents through both circuit breakers, and the current responsive means associated with another pole of one of the circuit breakers being responsive to the current through one circuit breaker only.

16. In combination, an electrical transformer comprising a casing, a primary winding and a secondary winding within the casing, a plurality of circuit conductors from said secondary winding to a plurality of junction points, a plurality of circuit conductors extending from said junction points through the casing to separate distribution circuit portions exterior to the casing, a multi-pole circuit breaker within the casing comprising contact means, operating means for causing the opening of said contact means, separate circuit responsive means associated with each pole of the circuit breaker operable to cause said operating means to open the contact means, a pair of terminal means and means connecting said contact means and said current responsive means in series between said terminal means, a second multi-pole circuit breaker also comprising contact means, operating means for causing the opening of said contact means, separate current responsive means associated with each pole of the circuit breaker operable to cause said operating means to open the contact means, a second pair of terminal means and means connecting said contact means and said current responsive means in series between said second pair of terminal means, the current responsive means associated with a pole of one of the circuit breakers being responsive to the sum of the currents through both circuit breakers, and the current responsive means associated with a pole of the other of said circuit breakers being responsive to the sum of the currents through both circuit breakers, and the current responsive means associated with the other poles of the two circuit breakers being responsive to the current through the associated circuit breaker only.

17. In combination, an electrical transformer comprising a casing, a primary winding and a secondary winding within the casing, a plurality of circuit conductors from said secondary winding to a plurality of junction points, a plurality of circuit conductors extending from said junction points through the casing to separate distribution circuit portions exterior to the casing, a multi-pole circuit breaker within the casing comprising contact means, operating means for causing the opening of said contact means, separate circuit responsive means associated with each pole of the circuit breaker operable to cause said operating means to open the contact means, a pair of terminal means and means connecting said contact means and said current responsive means in series between said terminal means, a second multi-pole circuit breaker also comprising contact means, operating means for causing the opening of said contact means, separate current responsive means associated with each pole of the circuit breaker operable to cause said operating means to open the contact means, a second pair of terminal means and means connecting said contact means and said current responsive means in series between said second pair of terminal means, the current responsive means associated with each pole of one of the circuit breakers being responsive to the sum of the currents through both circuit breakers, and the current responsive means associated with each pole of the other of the circuit breakers being responsive to the current through one circuit breaker only.

ALLAN D. FORBES.

REFERENCES CITED

The following references are of record in the file of this patent:

UNITED STATES PATENTS

| Number | Name | Date |
|---|---|---|
| 1,893,356 | Blake | Jan. 3, 1933 |
| 2,337,829 | Lockie | Dec. 28, 1943 |
| 2,340,057 | Hodnette | Jan. 25, 1944 |